US009054394B2

(12) United States Patent
    Sammells (10) Patent No.: US 9,054,394 B2
(45) Date of Patent: Jun. 9, 2015

(54) SECONDARY ALKALI METAL/OXYGEN BATTERIES

(71) Applicant: DYNANTIS CORPORATION, Santa Barbara, CA (US)

(72) Inventor: Anthony F. Sammells, Santa Barbara, CA (US)

(73) Assignee: DYNANTIS CORPORATION, Santa Barbara, CA (US)

( * ) Notice: Subject to any disclaimer, the term of this patent is extended or adjusted under 35 U.S.C. 154(b) by 187 days.

(21) Appl. No.: 13/931,395

(22) Filed: Jun. 28, 2013

(65) Prior Publication Data
    US 2015/0002098 A1    Jan. 1, 2015

(51) Int. Cl.
    *H02J 7/00*     (2006.01)
    *H01M 12/08*    (2006.01)
    *H01M 4/38*     (2006.01)
    *H01M 4/86*     (2006.01)

(52) U.S. Cl.
    CPC .............. *H01M 12/08* (2013.01); *H01M 4/381* (2013.01); *H01M 4/8605* (2013.01); *H01M 2300/0074* (2013.01)

(58) Field of Classification Search
    USPC ....................................................... 320/128
    See application file for complete search history.

(56) References Cited

U.S. PATENT DOCUMENTS

| 4,424,262 | A | 1/1984 | Von Alpen et al. |
| 4,452,777 | A | 6/1984 | Abraham et al. |
| 4,740,436 | A | 4/1988 | Kobayashi et al. |
| 5,187,035 | A | 2/1993 | Miyabayashi et al. |
| 5,308,711 | A | 5/1994 | Passaniti et al. |
| 5,624,604 | A | 4/1997 | Yasrebi et al. |
| 5,972,538 | A | 10/1999 | Saito et al. |
| 6,127,061 | A | 10/2000 | Shun et al. |
| 6,203,940 | B1 | 3/2001 | Oltman et al. |
| 6,534,211 | B1 | 3/2003 | Tsukuda et al. |
| 6,537,940 | B1 | 3/2003 | Virkar et al. |
| 6,632,763 | B2 | 10/2003 | Virkar et al. |
| 6,780,347 | B2 | 8/2004 | Ndzebet |
| 6,833,217 | B2 | 12/2004 | Woodnorth et al. |

(Continued)

FOREIGN PATENT DOCUMENTS

| WO | WO 03/001617 | 1/2003 |
| WO | WO 2004/042841 | 5/2004 |

(Continued)

OTHER PUBLICATIONS

Agrafiotis et al. (2002) "Evaluation of sol-gel methods for the synthesis of doped-ceria environmental catalysis systems. Part I: preparation of coatings," *Journal of the European Ceramic Society*. 22:15-25.

(Continued)

*Primary Examiner* — Yalkew Fantu
(74) *Attorney, Agent, or Firm* — Lathrop & Gage LLP (57) ABSTRACT

Batteries employing an oxygen (air) electrode, particularly those in which the oxygen electrode is combined with an alkali metal or alkaline earth metal negative electrode useful I for bulk energy storage, particularly for electric utility grid storage, as well as for electric vehicle propulsion. Batteries have an electrochemically reversible oxygen positive having a porous mixed metal oxide matrix for receiving and retaining discharge product and a dense (non-porous) separator element which conducts oxygen ions and electrons in contact with a source of oxygen.

20 Claims, 3 Drawing Sheets

OVERALL REACTION

Na + ½ O$_2$ ⇌ Na$_2$O

(56) References Cited

U.S. PATENT DOCUMENTS

| | | | |
|---|---|---|---|
| 6,991,876 B2* | 1/2006 | Narang et al. | 429/231.95 |
| 7,238,448 B1 | 7/2007 | Kaplan et al. | |
| 7,259,126 B2 | 8/2007 | Gordon et al. | |
| 7,585,579 B1* | 9/2009 | Read | 429/405 |
| 7,615,508 B2 | 11/2009 | Kaplan et al. | |
| 8,012,633 B2 | 9/2011 | Gordon et al. | |
| 8,252,451 B2 | 8/2012 | Mizuno et al. | |
| 8,273,497 B2 | 9/2012 | Mizuno | |
| 8,518,583 B2 | 8/2013 | Mizuno et al. | |
| 8,802,304 B2 | 8/2014 | Amendola et al. | |
| 2009/0134842 A1* | 5/2009 | Joshi et al. | 320/127 |
| 2011/0195320 A1 | 8/2011 | Nishikoori et al. | |
| 2012/0219842 A1 | 8/2012 | Visco et al. | |
| 2012/0321970 A1 | 12/2012 | Friesen et al. | |
| 2013/0101907 A1 | 4/2013 | Takahashi et al. | |
| 2013/0115528 A1 | 5/2013 | Lu | |
| 2013/0157149 A1 | 6/2013 | Peled et al. | |

FOREIGN PATENT DOCUMENTS

| | | |
|---|---|---|
| WO | WO 2011/154869 | 12/2011 |
| WO | WO 2012/001745 | 1/2012 |
| WO | WO 2012/061817 | 5/2012 |
| WO | WO 2013/093044 | 6/2013 |

OTHER PUBLICATIONS

Buchler et al. (2007) "Preparation and Properties of Thin $La_{1-x}Sr_xCo_{1-y}Fe_yO_{3-\delta}$ Perovskitic Membranes Supported and Tailored Ceramic Substrates," *Solid State Ionics*. 178:91-99.

Fagg et al. (2003) "The Effect of Cobalt Oxide Sintering Aid on Electronic Transport in $Ce_{0.80}Gd_{0.20}O_{2-67}$ Electrolyte," *Electrochimica Acta*. 48:1023-1029.

Hartmann et al. (Dec. 2, 2012) "A rechargeable room-temperature sodium superoxide ($NaO_2$) battery," *Nat. Mater.* 12:228-232.—with supplementary information.

International Search Report with Written Opinion corresponding to International Patent Application No. PCT/US2014/044682, mailed Oct. 3, 2014.

Kleinlogel et al. (2000) "Mixed Electronic-Ionic Conductivity of Cobalt Doped Cerium Gadolinium Oxide," *Journal of Electroceramics*. 5:231-243 (Abstract Only).

Lim et al. (Jun. 11, 2013) "Toward a Lithium-'Air' Battery: The Effect of $CO_2$ on the Chemistry of a Lithium—Oxygen Cell," *J. Am. Chem. Soc.* 135:9733-9742.

McCloskey (Oct. 13, 2011) "On the Efficacy of Electrocatalysis in Nonaqueous $Li-O_2$ Batteries," *J. Am. Chem. Soc.* 133:18038-18041.—with supplementary information.

Peng et al. (Aug. 3, 2012) "A Reversible Higher-Rate $Li-O_2$ Battery," *Science*. 337:563-566.

Roche et al. (2009) "Carbon-supported manganese oxide nanoparticles as electrocatalysts for oxygen reduction reaction (orr) in neutral solution," *J. Appl. Electrochem.* 39:197-204.

Sammells et al. (1992) "Rational selection of advanced solid electrolytes for intermediate temperature fuel cells," *Solid State Ionics*. 52:111-123.

Sammells et al. (2000) "Catalytic membrane reactors for spontaneous synthesis gas production," *Catal. Today*. 56:325-328.

Schwartz et al. (1993) "New Brownmillerite Solid Electrolytes," *J. Electrochem. Soc.* 140:L62-L63.

Stevenson et al. (1996) "Electrochemical Properties of Mixed Conducting Perovskites $La_{1-x}M_xCo_{1-y}Fe_yO_{3-67}$ (M=Sr, Ba, Ca)," *J. Electrochem. Soc.* 143(9):2722-2729.

Wang et al. (Sep. 23, 2013) "Oxygen Electrocatalysts in Metal-Air Batteries: From Aqueous to Nonaqueous Electrolytes," *Chem. Soc. Rev.* 43:7746-7786.

Zhang et al. (Oct. 2011) "Research progress and materials selection guidelines on mixed conducting perovskite-type ceramic membranes for oxygen production," *RSC Adv*. 1:1661-1676.

\* cited by examiner

FIG. 3

SECONDARY ALKALI METAL/OXYGEN BATTERIES

BACKGROUND OF THE INVENTION

There is a significant need in the art for improved secondary (rechargeable) batteries having high energy density, decreased cost, improved safety, reduced thermal management and improved stability of component supply. Batteries having such improved characteristics will be useful in a variety of applications and are of particular interest for electric utility grid storage.

Electric utilities are seeking more cost effective and efficient strategies to manage energy delivery to the grid. Peak demand is frequently met by the use of relatively expensive gas turbines, which at times of low demand remain idle. Ideally, base load electrical energy production could be operated at optimum peak efficiency, with demand variations being either absorbed or delivered using some form of energy storage. Pumped hydro (PH) technology, where water is reversibly pumped from a lower to higher elevation, has been employed for such energy storage, where round-trip efficiency is typically 68%. However, acceptable sites for implementation of PH energy storage, based upon location and environmental concerns, are now very limited. An alternatively is the use of large storage batteries, where round-trip energy conversion efficiencies can exceed that of PH, and wherein siting is not limited by geography. The market for storage batteries for this application is expected to grow, provided that battery costs are reduced and performance is increased. Major issues that are currently limiting implementation of advanced battery systems for grid storage include: overall cost for materials and associated hardware, long-term availability of materials, safety, achieving long cycle life and 5) thermal management during operation. The present invention provides an improved alkali metal/oxygen battery to meet these requirements. The batteries of the invention incorporate no toxic materials, and are generally safer than comparable battery systems (e.g., sodium-sulfur systems).

Improved secondary batteries will also provide particular benefit for applications to electric vehicles and their use will translate into greater range for such vehicles.

Various secondary metal air batteries have been reported. Cells of these batteries contain an air cathode (positive electrode) and a metal-based anode (negative electrode) separated by a liquid or solid electrolyte.

WO 2012/061817 relates to a secondary alkali-metal-air battery having a porous air cathode made of porous carbon with an electrocatalyst. The battery has an anode comprising alkali metal and a lithium ion-conductive membrane (e.g., a glass ceramic). The electrolyte is described as a fluid which is circulated between the anode and cathode.

WO 2012001745 and U.S. 2013101907 relate to a metal-air secondary battery with an air cathode made of porous metal. The cathode is described as containing the base material, a carrier, a catalyst and a binder. The catalyst is exemplified as a metal oxide.

U.S. Pat. No. 8,012,633 relates to a secondary metal-air battery with an alkali metal anode and an oxygen (air) cathode. The electrolyte is an aqueous catholyte. The battery contains an ion-selective membrane between the anode and the catholyte (preventing catholyte from entering the anode). Water soluble discharge product is described as stored in the aqueous catholyte. The oxygen cathode is exemplified by reference to U.S. Pat. No. 7,259,126 as having a gas-diffusion layer and a reaction layer. Both the gas-diffusion layer and the reaction layer are described as being made of Teflon and carbon.

U.S. 20130157149 and WO 2011/154869 relate to a rechargeable alkali metal-air battery. The battery contains a molten alkali metal anode, an air cathode and an electrolyte medium between them. An exemplified electrolyte medium is beta-alumina. The air cathode is described as an oxygen (gas) permeable porous substrate having a gas diffusion medium and an oxygen redox catalyst.

U.S. 2011/0195320 relates to an air secondary battery. The battery is report to include a hermetically sealed housing which allows maintenance of a lower than atmospheric pressure of oxygen-containing gas external to the battery cell. This feature is said to facilitate oxygen release from the cell. The air cathode is described as containing a conductive material and may contain a catalyst and is exemplified by a mixture of carbon black, $MnO_2$ and polymer coated on carbon paper.

Certain fuel cells also employ air electrodes. For example, U.S. Pat. No. 6,534,211 relates to a fuel cell having a fuel electrode and an air electrode separated by an electrolyte film. The air electrode is described as having a particular close-packed structure. The air electrode is described as porous and as being made from certain specific mixed metal oxides with certain ranges of particle size which is said to decrease shrinkage on sintering. WO2003/00167 relates to a hybrid fuel cell battery having liquid metal, anodic material, an electrolyte and a cathode. The cathode material is described as including mixed metal, including perovskite-type oxides. In examples the cathode is described as porous. Anodic material is said to include ceramics or ceramics doped with metal and examples of ceramics for anodic material include cerium oxide. In an embodiment the anodic layer is said to have ionic conductivity. The anodic layer in this device is described as between the liquid metal and the electrolyte and is not adjacent the cathode.

The present invention provides improved secondary alkali metal/oxygen batteries which possess high energy density, low cost and both rapid kinetics at the reversible oxygen electrode and, because of the nature of the strategy used for oxygen mediation to and from the cathode, long lifetime.

SUMMARY OF THE INVENTION

This invention relates to batteries employing an oxygen (air) electrode, particularly those in which the oxygen electrode is combined with an alkali metal or alkaline earth metal negative electrode. More specifically, the invention relates to alkali metal/oxygen batteries and more specifically to sodium/oxygen batteries. Batteries of the invention are useful for bulk energy storage, particularly for electric utility grid storage, as well as for electric vehicle propulsion.

In an embodiment, the invention provides an electrochemically reversible oxygen positive electrode and storage cells containing this electrode. The oxygen electrode is used in contact with an oxygen-containing gas, preferably ambient pressure air. In specific embodiments, the invention relates to storage cells having an alkali metal or alkaline earth negative electrode in combination with the reversible oxygen electrode. More specifically, the invention provides storage cells wherein the alkali metal electrode comprises liquid alkali metal and in particular embodiments, is a liquid sodium electrode.

The electrochemically reversible oxygen electrode comprises (i) a porous mixed metal oxide matrix, (ii) a dense (non-porous) separator element which conducts oxygen ions and electrons and which is formed of a mixed metal oxide which conducts both oxygen ions and electrons and (iii) a source of oxygen-containing gas, preferably ambient pressure air. The dense oxygen ion- and electron-conducting separator element is intermediate between the porous matrix and the source of oxygen-containing gas. The porous matrix of the cathode is not in direct contact with the oxygen-containing gas. Oxygen anions mediated through the dense oxygen ion- and electron-conducting separator element can enter the porous matrix.

The positive and negative electrodes of the cell are separated by a dense (non-porous) metal cation-conducting solid electrolyte. In specific embodiments, the dense (non-porous) metal cation-conducting solid electrolyte conducts an alkali metal cation or an alkaline earth metal cation. More specifically, the metal cation-conducting material is a β-alumina (beta alumina) which conducts an alkali metal cation or an alkaline earth metal cation. More specifically, the metal cation-conducting material is a β"-alumina (beta double prime alumina) which conducts an alkali metal cation or an alkaline earth metal cation. In specific embodiments, the metal cation-conducting material conducts an alkali metal cation (e.g., $Li^+$ or $Na^+$) or an alkaline earth metal cation (e.g., $Ca^{2+}$ or $Mg_2^+$). The porous matrix of the oxygen electrode is in direct contact with the dense metal cation-conductive solid electrolyte, and is not in direct contact with the source of the alkali metal or alkaline earth metal of the negative electrode. Preferred negative electrodes are liquid metal (molten metal) electrodes.

In specific embodiments, positive and negative electrodes of the cell of this invention are separated by a dense (non-porous) alkali metal cation-conducting solid electrolyte. More specifically, the metal cation-conducting material is a β-alumina (beta alumina) which conducts an alkali metal cation. More specifically, the metal cation-conducting material is a β"-alumina (beta double prime alumina) which conducts an alkali metal cation. In specific embodiments, the metal cation-conducting material conducts $Li^+$ and/or $Na^+$. The porous matrix of the oxygen electrode is in direct contact with the dense alkali metal cation-conductive solid electrolyte, and is not in direct contact with the source of the alkali metal of the negative electrode. Preferred negative electrodes are liquid alkali metal (molten metal) electrodes. The solid electrolyte is preferably a sodium cation-conductive mixed metal oxide and more preferably is β"-alumina (beta-double prime alumina).

Alkali metal cations or alkaline earth metal cations mediated through the dense alkali metal cation-conducting electrolyte can enter the porous matrix.

The porous matrix of the positive electrode is positioned between the dense non-porous metal cation-conducting material and a dense oxygen anion-, electron-conducting material for receiving, on cell discharge, metal cations, particularly alkali metal cations or alkaline earth metal cations, from the negative electrode through the solid electrolyte and oxygen anions from the positive electrode through the dense oxygen anion- and electron-conducting layer thereof and for retaining discharge product formed on reaction of metal cations and oxygen anions. On cell discharge, metal is oxidized at the negative electrode and oxygen is reduced at the positive electrode and the respective ions are transported into the porous matrix and react therein to form the discharge product. In specific embodiments, the cell is rechargeable and on recharging, the discharge product reacts to form metal cations and oxygen anions which respectively return to the negative and positive electrodes.

The porous matrix of the cathode is formed from a metal cation-conductive mixed metal oxide, particularly wherein the cation is an alkali metal cation or an alkaline earth metal cation, and an oxygen anion- and electron-conductive mixed metal oxide. In a specific embodiment, the metal cation-conductive mixed metal oxide of the porous matrix is the same mixed metal oxide employed in the solid electrolyte of the cell. In a specific embodiment, the oxygen ion- and electron-conductive mixed metal oxide of the porous matrix is the same as the oxygen ion- and electron-conducting mixed metal oxide of the dense oxygen ion- and electron-conducting mixed metal oxide of the dense separator element of the oxygen electrode. In specific embodiments, the solid electrolyte of the cell is dense β-alumina or β"-alumina which conducts alkali metal ions or alkaline earth metal ions.

In specific embodiments, the cell is a sodium/oxygen cell and the sodium-ion conductive mixed metal oxide is β"-alumina (beta double prime alumina) and the porous matrix comprises β"-alumina. In another specific embodiment, the cell is a sodium/oxygen cell and the sodium-ion conductive mixed metal oxide is β"-alumina (beta double prime alumina) and the porous matrix comprises β"-alumina and an oxygen- and electron-conducting mixed metal oxide. More specifically, the oxygen- and electron-conducting mixed metal oxide is a transition metal-doped ceria, perovskite, brownmillerite or fluorite.

The dense oxygen anion and electron-conductive mixed metal oxide separator element of the positive electrode has two surfaces, a surface (herein called the outer surface) in contact with the oxygen-containing gas and a surface (inner surface) in contact with the porous matrix of the cathode. In an embodiment, an oxygen-redox catalyst is optionally provided on the outer surface of the dense electron and oxygen ion-conducting layer. In a specific embodiment, the catalyst is a noble metal catalyst. In a specific embodiment, the oxygen-redox catalyst is Pt, Pd, Ru, Rh, Ir or combinations thereof. In a more specific embodiment, the oxygen-redox catalyst is Pt or Pd. In a specific embodiment, the oxygen-redox catalyst is Ag. In a specific embodiment, the oxygen-redox catalyst is a mixed metal oxide, for example a catalytic perovskite.

In specific embodiments, the mixed metal oxide which conducts oxygen ions and electrons comprises cerium and more specifically is a transition metal-doped ceria. In specific embodiments, the transition metal doped ceria comprises one or more rare-earth metals, including yttrium (Y), other than cerium. In specific embodiments, the transition metal-doped ceria comprises Sm, Y, Pr, Nd or Gd or combinations thereof. In specific embodiments, the transition metal-doped ceria comprises a combination of two rare earth metals in addition to Ce. In specific embodiments, the transition metal-doped mixed metal oxide comprises cerium and gadolinium. In specific embodiments, the transition metal-doped mixed metal oxide comprises cerium and a combination of Sm and Nd. In specific embodiments, transition metals of the transition metal-doped mixed metal oxides include Co, Cu, Fe, Mn, Ni, Zr or combinations thereof.

In specific embodiments, the oxygen ion- and electron-conducting mixed metal oxide is $CO_{0.04}Ce_{0.76}Gd_{0.2}O_{2-x}$, where x is a number which renders the formula charge neutral.

In other embodiments, the oxygen ion- and electron-conducting mixed metal oxide has the formula:

where X is a transition metal (or mixture of transition metals); Z is a rare earth metal (including yttrium), or combination thereof, other than cerium; a is 0.01-0.05; b is 0.1 to 0.3 and x is a number that renders the formula charge neutral. In specific embodiments, Z is Sm, Y, Pr, Gd or a combination thereof. In specific embodiments, X is Co, Cu, Fe, Mn, Ni, Zr or combinations thereof.

In other embodiments, the oxygen ion- and electron-conducting mixed metal oxide has the formula:

$$CO_aCe_{1-a+b}Gd_bO_{2-x}$$

where a is 0.01-0.05, b is 0.1 to 0.3 and x is a number that renders the formula charge neutral.

In specific embodiments, a cell of this invention includes a solid electrolyte (e.g., beta-alumina or beta double prime alumina) element (a sheet, layer or tube) having a thickness ranging from 0.5 to 3 mm, or more preferably having a thickness of 0.5 to 1.5 mm. In specific embodiments, a cell of this invention includes a porous matrix for receiving discharge product which is in the form of a layer, sheet or element of thickness ranging from 1 to 4 mm or more preferably from 1.5 to 3 mm. In specific embodiments, a cell of this invention includes a dense oxygen ion- and electron-conducting separator element ranging in thickness from 5-80 microns, 10 to 50 microns or 20 to 60 microns.

In specific embodiments, the cell of this invention is operated at a temperature at which the dense mixed metal oxide of the cathode exhibits both oxygen and electron conduction. In other specific embodiments, the cell of this invention is operated at a temperature at which the alkali metal is liquid and the dense mixed metal oxide of the cathode exhibits both oxygen and electron conduction. In a specific embodiment, the cell is operated at a temperature between about 150 to 300° C. Yet more specifically, the cell is operated at a temperature between 200 to 275° C.

The invention provides a battery comprising one or more storage cells of this invention. In such a battery the storage cells may be electrically connected in series, in parallel or both, as is known in the art.

The invention also provides a method for producing a storage cell comprising:
  forming a negative electrode comprising alkali metal or an alkaline earth metal
  forming an oxygen positive electrode comprising a porous mixed metal oxide matrix, and a dense separator element which conducts oxygen anions and electrons formed of a mixed metal oxide which conducts oxygen anions and electrons;
  positioning a dense, alkali metal or alkaline earth metal ion-conductive solid electrolyte between the anode and the cathode, and
providing a source of oxygen-containing gas to the positive electrode and a source of alkali metal or alkaline earth metal to the negative electrode.

The invention also provides a method for producing a storage cell comprising:
  forming a negative electrode comprising liquid alkali metal;
  forming an oxygen positive electrode comprising a porous mixed metal oxide matrix, and a dense separator element which conducts oxygen anions and electrons formed of a mixed metal oxide which conducts oxygen anions and electrons;
  positioning a dense, alkali metal ion-conductive solid electrolyte between the anode and the cathode, and
providing a source of oxygen-containing gas to the positive electrode and a source of alkali metal to the negative electrode.

More specifically, the porous matrix is formed from an alkali metal or alkaline earth metal cation-conductive mixed metal oxide and a mixed metal oxide which conducts both oxygen ions and electrons. In a specific embodiment, the porous matrix is formed from a porous layer of the alkali metal ion-conductive mixed metal oxide or the alkaline earth metal ion-conductive mixed metal oxide adjacent a porous layer of oxygen ion- and electron-conductive mixed metal oxide. In a specific embodiment, the porous matrix is formed at least in part by forming a porous layer of an alkali metal-ion conducting mixed metal oxide on one surface of a dense layer of an alkali metal-ion conducting mixed metal oxide. In another specific embodiment, the porous matrix is formed at least in part by forming a porous layer of an alkaline earth metal-ion conducting mixed metal oxide on one surface of a dense layer of an alkaline earth metal-ion conducting mixed metal oxide. The dense solid electrolyte of the invention may be in the form of a one-end closed tube. In a specific embodiment, the porous matrix and the oxygen electrode of invention can be formed as multiple layers on such a one-end closed tube.

In a more specific embodiment, the dense layer of the alkali metal-ion conductive mixed metal oxide is in the form of a one-end closed tube for receiving liquid alkali metal and a portion of the porous matrix is formed on the outer surface of the tube by dip coating of a suspension comprising an alkali metal cation-conducting mixed metal oxide. In a specific embodiment, mixed conducting mixed metal oxide is introduced into the porous matrix and the dense mixed conducting separator element are formed by applying a green ceramic tape of the mixed conducting mixed metal oxide to the pre-sintered porous matrix formed from alkali metal cation-conducting mixed metal oxide and co-sintering.

The invention further provides a method for generating energy, comprising discharging one or more cells of the invention. The invention further provides a method for generating energy which comprises forming one or more cell of this invention and discharging the one or more cells. In specific embodiments, the cells of the invention are rechargeable and the methods for generating energy further comprise a step of storing electrical energy which comprises recharging the one or more cells after discharge.

The invention further provides a battery for use in electric utility grid storage which comprises one or more cells of this invention. More specifically, the battery for use in the electric vehicle comprises one or more cells wherein the cells are sodium/oxygen cells comprising the oxygen positive electrode of this invention.

The invention further provides a battery for use in an electric vehicle which comprises one or more cells of this invention. More specifically, the battery for use in the electric vehicle comprises one or more cells wherein the cells are sodium/oxygen cells comprising the oxygen positive electrode of this invention.

Other aspects and embodiments of the invention will be apparent on review of the detailed description and the figures herein.

DESCRIPTION OF THE INVENTION

The present invention is based at least in part on the use of a porous matrix in an oxygen electrode particularly for use in an metal/oxygen cell and more particularly for use in an alkali metal or alkaline earth metal/oxygen cell. The porosity within this porous matrix accommodates the electrochemical discharge product of the battery without any direct contact to the metal or the oxygen-containing gas. The porous cathode matrix possesses a morphology accommodating distinct regions for both oxygen anion and metal cation mobility and can retain the electrochemical discharge product. The porous region is formed from a metal ion-conducting mixed metal oxide and a mixed oxygen ion- and electron-conducting mixed metal oxide. Preferably, the metal cation-conducting mixed metal oxide is selective for conduction of alkali metal ions or alkaline earth metal ions, e.g., for sodium cation. Separation of the porous matrix from the oxygen-containing gas is accomplished by cladding one side of the matrix with a dense mixed oxygen anion- and electron-conducting material (e.g., a dense mixed metal oxide). Separation of the porous matrix from the metal negative-electrode active material is accomplished by formation of the porous matrix with the other side adjacent to dense metal ion-conducting solid electrolyte.

Inclusion of the porous matrix in the oxygen electrode provides for a reversible oxygen electrode. The porous matrix which will retain the electrochemical discharge product of the cell is configured in the cell to isolate the discharge product form direct contact with the atmosphere (i.e., oxygen). Isolation is achieved using a dense oxygen anion- and electron-conducting separator between the porous matrix and the source of oxygen-containing gas. Oxygen reduction and oxygen anion oxidation electrochemistry occurs on the outside surface of the dense oxygen anion- and electron-conducting separator. The oxygen anion- and electron-conducting mixed metal oxide of the separator can function as an oxygen-redox catalyst. The outside surface of the separator can optionally be provided with an oxygen-redox catalyst which can be coated, dispersed, sprayed or deposited on that outside surface. Any known oxygen-redox catalyst can be employed. Specific examples of useful catalyst include Pt or Ag. In a specific embodiment, Pt or Ag can be dispersed on the outside surface of the separator in the oxygen electrode. Dispersion of Pt can be achieved for example by thermal decomposition of chloroplatinic acid. Dispersion of Ag can be achieved for example by decomposing silver nitrate. Other art-known methods of applying a catalytic coating or dispersion can be employed without limitation with the caveat that the catalyst employed and method of application should not significantly detrimentally affect the conductive properties of the dense oxygen anion- and electron-conductive separator.

Figure 1:
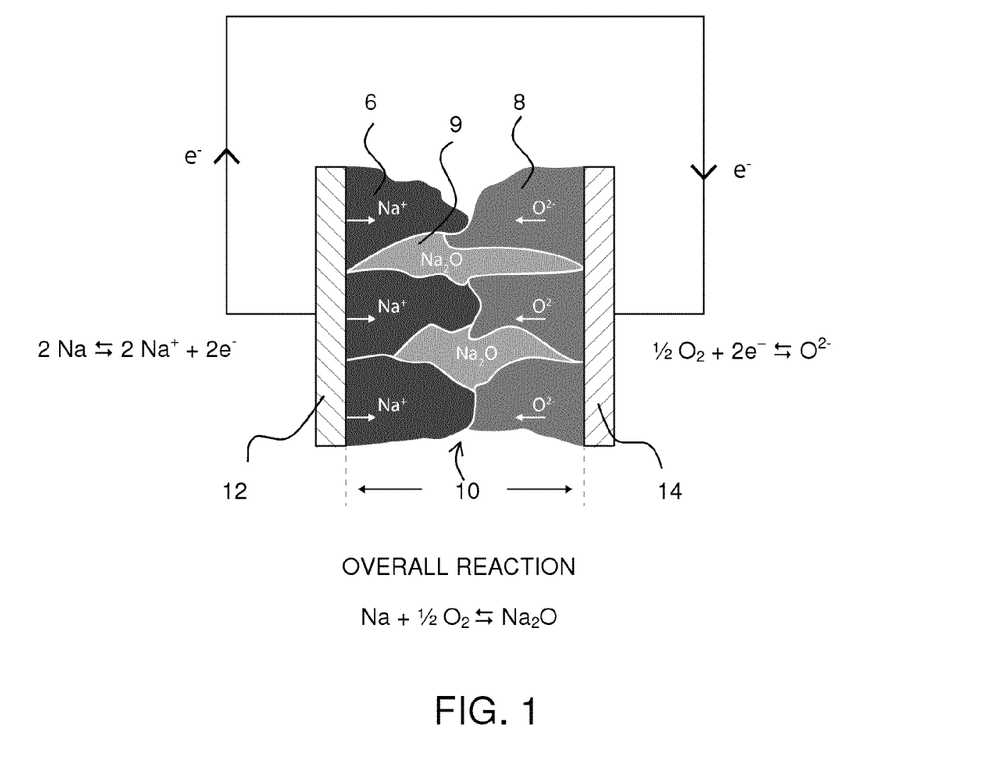
FIG. 1 is a schematic illustration of the porous matrix of the oxygen electrode of this invention. The porous matrix comprises regions of metal ion conductivity (e.g., alkali metal or alkaline earth metal ion conductivity) and regions of oxygen ion and electron conductivity as well as porosity for receiving and retaining discharge product. The porous matrix is illustrated for an exemplary sodium ion/oxygen cell.

FIG. 1 schematically illustrates the porous matrix of the oxygen electrode of this invention exemplified for use with sodium where the discharge product formed is $Na_2O$. The porous matrix (10) is illustrated as positioned between dense sodium ion conducting ceramic (12, e.g., sodium ion—conducting β"-alumina) and dense mixed oxygen anion- and electron-conducting ceramic (14). The porous matrix is not in direct contact with the sodium source or the oxygen-containing gas. The porous matrix is shown as non-homogeneous having regions of sodium cation conductivity (6) and regions of oxygen anion conductivity (7) as well as regions (8, e.g., pores) where discharge product can accumulate on cell discharge. Recharging of the cell by application of a voltage to the cell (not shown) results in reaction of the discharge product releasing oxygen at the cathode and returning alkali metal to the anode. The porous matrix of FIG. 1 is illustrated with sodium as the alkali metal, but it will be appreciated in the art that the cell and porous matrix can be implemented with other alkali metals and alkaline earth metals.

In a specific embodiment, the dense separator element of the oxygen electrode and the porous matrix of the oxygen electrode comprise the same mixed oxygen anion- and electron-conducting material. In a specific embodiment, the porous matrix comprises the same alkali metal-conducting material as in the alkali metal-conducting solid electrolyte. In a specific embodiment, the dense separator element and the porous matrix of the oxygen electrode comprise a mixed oxygen anion- and electron-conducting mixed metal oxide having the same metal ions, but wherein the stoichiometry of the metal ions in the porous and dense material is different. In a specific embodiment, the porous matrix of the oxygen electrode comprises an alkali metal-conducting mixed metal oxide having the same metal ions as the alkali metal-conducting mixed metal oxide of the solid electrolyte, but wherein the stoichiometry of the metal ions in the porous and dense material is different.

The terms "oxygen anion- and electron-conducting," "mixed conducting", and "conducting oxygen anions and electrons" are used interchangeable herein to refer to a material which exhibits oxygen ion conductivity and electron (or electronic) conductivity. In specific embodiments, the materials exhibiting mixed conduction are mixed metal oxides, particularly transition metal-doped ceria and more particularly transition metal-doped ceria also containing one or more rare earth metal ions. Mixed conducting mixed metal oxides typically exhibit oxygen anion- and electron-conduction at temperatures above ambient. As is understood in the art, ion and electron conductivity of such materials can vary with temperature and metal composition of the mixed metal oxides. As is also understood in the art, the ion and electron conductivities of such materials also vary with the thickness of the material through which the ions and electrons are conducted.

A variety of mixed conducting mixed metal oxides are known in the art. (See: Zhang et al. RSC Adv. (October, 2011) 1661-1676 and citations therein). Those exhibiting both high ion and high electron conductivities at temperature of 300° C. or less are preferred. In specific embodiments, the oxygen ion- and electron-conducting mixed metal oxide are doped ceria (see, for example, C. M. Kleinlogel and L. J. Gauckler, Journal of Electroceramics, 5, 231 (2000); H. Zhang, J. Wang and S. Wang, Trans. Nonferrous Met. Soc. China, 17, 565 (2007); C. Agrafiotis, A. Tsetsekou, C. J. Stournaras, A. Julbe, L. Dalmazio and C. Guizard, Journal of the European Ceramic Society, 22, 15 (2002).

More specifically, mixed conducting mixed metal oxides include those having the formula:

where X is a transition metal (or combination of transition metals); Z is a rare earth metal (including yttrium), or combination thereof, other than cerium; a is 0.01-0.05; b is 0.1 to 0.3 and x is a number that renders the formula charge neutral. In specific embodiments, Z is Sm, Y, Pr, Nd, Gd or a combination thereof. In specific embodiments, X is Co, Cu, Fe, Mn, Ni, Cr, Zr or combinations thereof. In specific embodiments, X is Co, Cu, Fe, Ni and Z is Gd.

Mixed conducting mixed metal oxides also include among others perovskites, brown millerites and fluorites.

Exemplary mixed conducting perovskites include those of formula: $La_{1-a}M_aBO_{3-x}$, where M is Sr, Ba or Ca and B is a transition metal or combination thereof. (Stevenson et al. (1996) J. Electrochem. Soc. 143(9):2722-2729).

Exemplary mixed conducting brown millerites include those of formula: $A_2BB'O_5$, where A is, for example, Sr or a combination of Sr with Ca and/or Ba and B and B' are a combination of transition metals. (see also A. F. Sammells, et al. (2000) Catal. Today, 56, 325-328; A. F. Sammells et al. (1992) Solid State Ionics, 52, 111-123 and M. Schwartz, et al. J. Electrochem. Soc. 140, L62-63).

Exemplary mixed conducting materials include yttria-stabilized zirconia, transition metal doped-yttria-stabilized zirconia and cermets prepared with yttria-stabilized zirconia.

The mixed conducting materials employed in the cells and batteries herein which are dense and function to transport electrons and/or ions in the absence of transport of neutral species. Such materials function as separators or solid electrolytes.

The term "porous matrix" and "dense element" are used to describe components of the storage cells herein. These terms do not herein imply any particular structure or shape. In specific embodiments, the porous matrix and the dense element can be adjacent layers formed on a substrate and take the shape of that substrate. The substrate may itself be a component of the storage cell. For example, in an embodiment, the porous matrix and dense element may be formed on a solid electrolyte formed into a one-end-closed tube.

The term "dense" as used herein is synonymous with the term "non-porous" and refers to a component, element or layer that exhibits no through porosity. Dense components, elements or layers of this invention exhibit ion conductivity or both ion and electron conductivity. In such dense components, transport across the membrane occurs through the lattice structure and channels in the material rather than through pores. Dense ion-conductive components, elements or layers can function as separators allowing selective passage or transport of a selected ionic species (e.g., a particular alkali metal cation, e.g., sodium cation or a particular anion, e.g., oxygen anion), but not allowing direct transport of neutral species or other ions. It will be appreciated that some low level of direct transport of neutral species and/or other ions may be accommodated in the dense components, elements or layers herein without loss of function. It will be appreciated in the art, that the ion and electronic conductivity of materials used in the invention can vary with material composition, temperature, and thickness through which ions and electrons are transported.

The porous matrix component of this invention contains some level of pores through the matrix. The porous matrix must however retain sufficient mechanical strength at operating conditions to avoid unreasonable cracking or other breakdown. In specific embodiments, the pore volume of the matrix ranges from 5 to 35% and in more specific embodiments, the pore volume ranges from 5 to 25%. In an embodiment, the porous matrix of the oxygen electrode is microporous in which the mean pore size is 2 nm or less. In an embodiment, the porous matrix of the oxygen electrode is mesoporous in which the mean pore size is between 2 and 50 nm (inclusive).

In specific embodiments, sodium cation-conductive $\beta''$-alumina is useful as a sodium cation-conductive material. The crystalline structure of sodium cation-conductive $\beta''$-alumina, which possesses the general composition $NaAl_5O_8$, is a rhombohedral spinel with an R3m space group with lattice constants of 'a'=5.614 and 'c'=33.85 A respectively.

Various alkali metal conductive (including sodium-conductive) materials are known in the art.

Additional examples of alkali metal-conductive materials include, among others: a material having the formula $A_{1+x}Zr_2Si_xP_{3-x}O_{12}$ where $0.1 \leq x \leq 3$, where A is Na, K, or Li; a material having the formula $Na_{1+x}Zr_2Si_xP_{3-x}O_{12}$ where $0.1 \leq x \leq 3$; a material having the formula $A_5BSi_4O_{12}$ where A is Na, K, or Li, and B is Y, Nd, Dy, or Sm, or mixtures thereof; a non-stoichiometric alkali-deficient material having the formula $(A_5BSi_4O_{12})_{1-\delta}(B_2O_3 2SiO_2)_\delta$, where A is Na, K, or Li, and B is Nd, Dy, or Sm, or mixtures thereof and where $\delta$ is the measure of deviation from stoichiometry; a material with the formula $Li_{1+x}Al_xTi_{2-x}(PO_4)_3$ or $Li_{1.3}Al_{0.3}Ti_{1.7}(PO_4)_3$. Alternatively, the alkali metal conducting material can be a layered alkali ion conducting ceramic-polymer composite membrane, having alkali ion-selective polymers layered on alkali ion conducting ceramic solid electrolyte materials. Alternatively, the alkali metal-conducting material is a NaSICON, KSICON or LiSICON membrane available from Ceramatec, Inc (Salt Lake City, Utah). Other types of alkali-ion conductive substantially non-porous separators may also be used in the invention.

The cells and batteries of this invention operate over the temperature range 150-300° C., depending on the mixed conducting membrane thickness used in the oxygen electrode.

As exemplified for a sodium/oxygen cell, electrochemistry occurring during discharge proceeds as follows:

Negative Electrode $2Na \rightarrow 2Na^+ + 2e^-$     (1)

Positive (oxygen) Electrode $\frac{1}{2}O_2 + 2e^- \rightarrow O_2^-$     (2)

Overall $2Na + \frac{1}{2}O_2 \leftrightarrow Na_2O\ 2.0V$     (3)

The theoretical energy density of the sodium/oxygen cell is 1720 Wh/Kg. In comparison, the theoretical energy density for the sodium-sulfur system is 760 Wh/Kg and for the sodium-nickel chloride system is 730 Wh·Kg. In specific embodiments, cells of the present invention exhibit energy density greater than 800 Wh/Kg. More specifically, cells of the present invention exhibit energy density greater than 1000 Wh/Kg. More specifically, cells of the present invention exhibit energy density greater than 1250 Wh/Kg. More specifically, cells of the present invention exhibit energy density greater than 1500 Wh/Kg.

Figure 2:
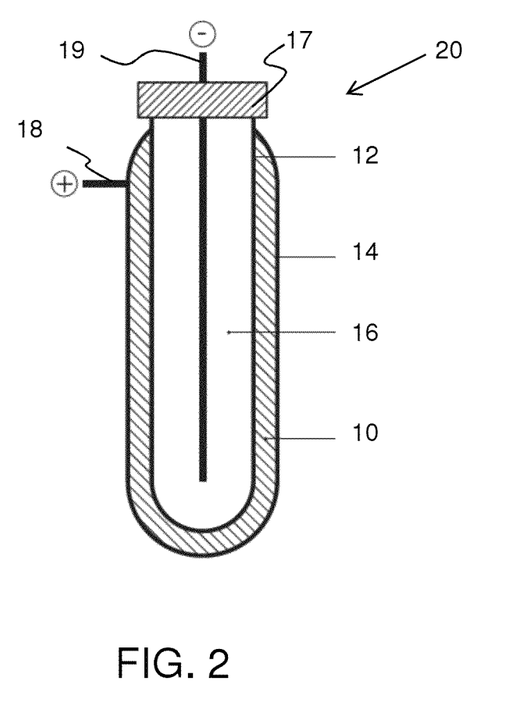
FIG. 2 is a schematic illustration of an exemplary electric storage cell of this invention. The exemplary cell is illustrated in a tubular geometry where the oxygen electrode elements are formed on a one-end closed tube of dense solid electrolyte. It will be appreciated that various other cell geometries can be implemented with the cell components as described herein.

A schematic illustration of an energy storage cell 20 of this invention is provided in FIG. 2. The cell comprises a liquid alkali metal (16), a dense alkali metal-conductive electrolyte (12), the porous matrix of the oxygen electrode as described above (10) and the dense mixed conducting ceramic (14) in contact with an oxygen-containing gas.

The cell of FIG. 2 is specifically illustrated with a tubular cell geometry where a tube formed of dense alkali metal-conductive electrolyte also serves to retain liquid alkali metal (e.g., liquid sodium). In this tubular geometry, the oxygen cathode elements (porous matrix and dense mixed conducting ceramic separator) are formed as layers on the tube. Positive (18) and negative (19) current collectors are provided. In a specific embodiment, current collection from the oxygen electrode in the tubular cell geometry is accomplished using a conductive wire spirally wound around the outside of the tube. A useful conductive wire is made of Pt. Ohmic contact between the current collector and the dense mixed conducting ceramic separator element is established using a conductive composition (conductive paste or paint), such as a platinum paste or more preferably a platinum paint. A useful high temperature platinum paint which contains 75% Pt solids possessing a colloidal particle size of 0.5 to 5 μm is commercially available (SPR-Chem, West Chester, Pa.). Once fully cured, this platinum paint (at 350° C. for four hours) exhibits a resistivity of 0.4 ohm cm$^{-1}$. Current collection from the oxygen electrode can also be accomplished using screen printed electronically conducting ceramics.

Further cell assembly adding the alkali metal and negative current collector is performed in an argon dry box. The cell assembly (solid electrolyte (12), and cathode (10 and 14) comprising the porous matrix is slowly heated to above the melting temperature of the alkali metal at which time liquid alkali metal is slowly introduced into the open-end of the tube (16). This is followed by introducing current collector (18) co-axially into the tube. The current collector passes through a feed through (19) which for example, is formed from a crushable seal, e.g., made of boron nitride. The end of the alkali metal reservoir tube is hermetically sealed, for example, using a glass-ceramic seal. A useful seal can be formed using an appropriate mixture of glass and ceramic, which when heated to a temperature below the glass melting point, undergoes solid state reaction to form a single ceramic phase. A useful current collector material is low carbon steel. It will be recognized by one of ordinary skill in the art that conductive materials other than those specifically exemplified can be employed as current collectors in the cells of this invention.

For a sodium/oxygen cell, the cell assembly is heated to 150° C. and liquid sodium is added to the tubular reservoir (16), the current collector (18) is introduced into the liquid sodium in the tube through a feed through (19) and the tube is sealed. In a sodium/oxygen cell, the tube is formed from a dense sodium cation-conducting ceramic, preferably sodium cation-conducting β"-alumina.

Figure 3:
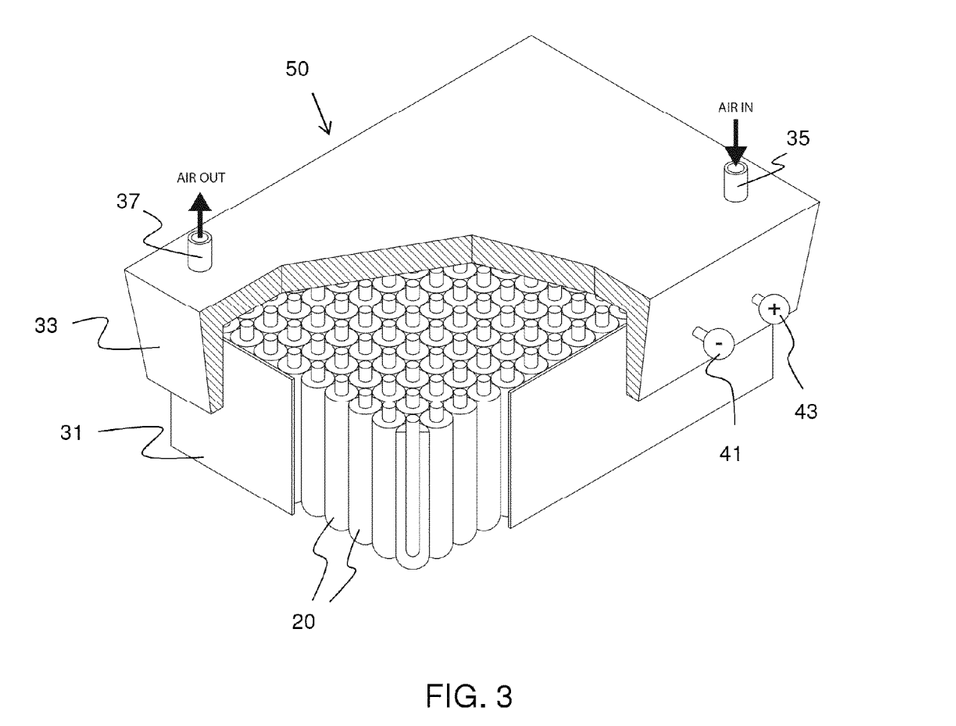
FIG. 3 is a schematic illustration of an exemplary multi-cell battery of this invention. The battery is exemplified with a plurality of tubular geometry cells as described in FIG. 2.

Batteries of the invention comprise one or more storage cells of the invention, electrically connected in series or in parallel as is known in the art. FIG. 3 provides a schematic illustration of an exemplary battery (50) of the invention. The battery is illustrated as comprising a plurality of cell of the invention (20). As is understood in the art dependent upon voltage and current requirements in a given application the cells may be electrically connected in series or in parallel. Electrical connection of the cells is not shown in FIG. 3. The illustrated battery is formed within a housing, which can be a two part housing with a base container 31 and a cover 33. Such a housing can be sealed employing any appropriate art-recognized method. Alternatively, the housing may be unitary. In the illustrated battery a chamber, channel or plurality of channels (not specifically shown) is/are formed within the battery housing allowing access of oxygen-containing gas into the chamber or channels. Note that cells may be selectively spaced to provide for additional channels for access of oxygen-containing gas. The housing may have a plurality of access points to allow the oxygen-containing gas to circulate in contact with the oxygen electrodes of the cells. In the illustrates battery, an air inlet 35 and an air outlet 37 are shown. Battery terminals (positive 43 and negative 41) are provides through the battery housing. These terminal are electrically connected to the cells within the battery.

Supports may be provides within the battery housing for one or more of the cells therein. The battery may be cooled, for example, by contact with a cooling liquid with the housing or by introducing one or more channels into and through the housing for carrying a cooling liquid.

Cells and batteries of this invention are useful in a variety of application and preferably are used for electric energy storage or electric vehicle propulsion.

In specific embodiments, the cells of the invention are sodium/oxygen cells which provide particular benefit over the currently competing sodium-sulfur or sodium-nickel chloride cells. In a specific embodiment, the reversible oxygen electrode of this invention can replace sodium-polysulfide and nickel chloride electrodes in currently competing sodium-sulfur or sodium-nickel chloride cells. The reversible oxygen electrode of this invention, can for example, be combined with liquid sodium electrodes that are currently known in the art and specifically those that have been developed for sodium-sulfur and sodium-nickel chloride cells.

Sodium/oxygen cells and batteries of the present invention exhibit specific advantages over sodium-sulfur and sodium-nickel chloride cells and batteries. In the case of the sodium-sulfur system, the cells of this invention avoid potential explosion hazards associated with rupture of the β"-alumina solid electrolyte at battery operating temperature when unit activity liquid sodium and liquid sodium polysulfide would come directly into contact. In the case of cell rupture in the system of the invention, atmospheric oxygen is a far more dilute reactant than liquid polysulfide and consequently is safer. No toxicity issues exist when using atmospheric oxygen as the cathode electroactive species in the system of this invention, compared to nickel chloride in the sodium-nickel chloride system. Nickel constitutes 62% of electroactive material cost in the sodium-nickel chloride system, in contrast, the positive electroactive material in the system of the invention is directly available from the atmosphere. Furthermore, in all battery systems heat is generated as a result of internal resistance losses. In the case of ambient temperature batteries some provision must be made for thermal management, particularly when high discharge rates are used. In the system of this invention, this is not an issue since it will be able to comfortably absorb excess heat as a consequence of its operating range being between 150 and 300° C.

EXAMPLE 1

Preparation of Cathode Matrix Oxygen Electrode

One method for preparation of the cathode structure of this invention involves forming the cathode on a surface of the dense alkali metal-conducting solid electrolyte. The method is exemplified employing sodium cation-conducting β"-alumina. In a specific embodiment, a dense β"-alumina in the form of a closed-one-end tube is employed as the solid electrolyte. In the cell to be constructed, the alkali metal (e.g., sodium metal) is retained within the closed-one-end tube. The inner surface of the dense β"-alumina tube is in contact with the alkali metal and the cathode is prepared on the outer surface of the tube.

Closed-one-end sintered tubes of β"-alumina are commercially available from Ionotec (Osakis, Mn). For example, tubes (7 cm long) with an internal diameter of 0.65 cm and a wall thickness of 0.5 mm are available. These solid electrolyte tubes are expected to have resistivity for sodium ion conduction of 0.042 Ohm m at 300° C. and a coefficient of thermal expansion of 7.2×10-6° C. Closed-one-end tubes of β"-alumina can be prepared using isostatic pressing and sintering procedures which are known in the art.

A porous layer of β"-alumina, nominally possessing the same mixed metal oxide composition as the tube is introduced onto the outer wall of the closed-one-end β"-alumina tube. This porous layer is prepared by dip coating a precursor suspension of particulate β"-alumina onto the outer wall of the tube. The dip-coated tube is then bisc sintered (pre-sintered) to initiate adhesion to the β"-alumina tube via interparticulate necking. A porous β"-alumina layer is thus formed on the outer surface of the tube. A mixed oxygen anion- and electron-conducting ceria powder of selected composition (e.g., $Co_{0.04}Co_{0.76}Gd_{0.2}O_{2-x}$) is tape-cast onto a film. The tape-cast film is placed around the perimeter of the pre-sintered porous β"-alumina layer on the β"-alumina tube. The resulting assembly is co-sintered at elevated temperature and slowly cooled to anneal the interfacial region between the porous β"-alumina and the mixed conducting ceria. During this process, there is some migration of the mixed conducting mixed metal oxide into the porous β"alumina layer forming the desired porous matrix and an outer portion of the doped ceria forms a dense layer. In the cell to be constructed, this dense electron- and oxygen ion-conducting layer will be in direct contact with the oxygen-containing gas (e.g., air).

A. Preparation of Porous β"-Alumina Region of the Porous Matrix

As noted above, dense sodium cation-conductive β"-alumina tubes for use as electrolytes are commercially available. These electrolyte materials have the general formula $NaAl_5O_8$. Powders possessing the nominal composition $NaAl_5O_8$ are prepared from stoichiometric powders of the appropriate carbonates and metal oxides. After thorough preliminary mixing, ethylene glycol (approximately 3-4 drops of per 30 g of the metal oxide/carbonate mixture) is added to the mixture as a grinding aid prior to ball milling in an alumina ball mill, using alumina grinding balls. Grinding is continued (6-48 h) until the desired particle size is obtained. Final particle size is initially adjusted to between 1 and 5 microns, as determined, for example, upon microscopic examination following separation using mechanical sieves.

After grinding, solid-state synthesis is performed by heating the mixture in the atmosphere at 10° C./min to between 800 and 1100° C. and maintaining the mixture at this temperature for several hours. The resulting solid state reaction mixture is reground for several hours again using ethylene glycol as a grinding aid, followed by heating at elevated temperature to ensure that complete solid-state reaction has occurred. X-ray diffraction (XRD) analysis is performed on powder samples at this stage to ensure that the appropriate material is present and that it is single phase.

The prepared β"-alumina powder is introduced into a precursor colloidal suspension for dip coating. Preferably the suspension has sufficient viscosity to adhere to the tube wall. A suspension viscosity of around 3000 centipoise can be used in this process. The dip-coating suspension preferably contains one or more solvents, one or more binders, one or more plasticizers, one or more dispersants and optionally one or more stabilizers.

In a specific embodiment, the solvent is a mixture of trichloroethylene and ethanol. In a specific embodiment, the solvent mixture is an azeotropic mixture of solvents. In a specific embodiment, the solvent mixture is an azeotropic mixture of trichloroethylene and ethanol.

In a specific embodiment, the suspension contains 50 to 70 weight % powder with the remainder largely solvent. Binder represents 1 to 4 weight % of the suspension. Plasticizer and dispersant represent from 3-6 weight % of the suspension. A colloid stabilizer such as glycerol phosphate is optionally added in an amount ranging from 1-5 weight %. See: U.S. Pat. No. 5,624,604 for exemplary colloid stabilizers. In a specific embodiment, the solvent is a mixture of trichloroethylene and ethanol. Binders which can be used include among others synthetic polymers (e.g., polyvinyl alcohol, polyvinyl butyral, acrylic binders) and natural polymers (e.g., cellulose, starch, etc.). A wide variety of useful dispersants are known in the art and commercially available. Menhadem fish oil is a dispersant which is often used for tape casting of ceramics. Other dispersants include ethoxylated amines, phosphate esters, fatty acids, Plasticizers that can be used include among others, glycols, phthalates, for example dioctyl phthalate, dibutylphthalate, di methylphthalate, butylbenzylphthalate, or polyethylene glycol.

An exemplary suspension has the composition of Table 1.

TABLE 1

Exemplary Composition of Suspension for Dip Coating

| Component | Function | Wt % |
|---|---|---|
| β"-alumina | Ceramic | 60.0 |
| Blown menhadem Fish oil | Dispersant | 1.0 |
| Trichloroethylene | Solvent | 22.3 |
| Ethanol | Solvent | 9.2 |
| Polyvinyl Butyral | Binder | 2.4 |
| Dioctyl phthalate | Plasticizer | 2.1 |
| Polyethylene glycol | Plasticizer | 2.0 |
| Glycerol phosphate | Colloid Stabilizer | 1.0 |

The suspension is prepared by dissolving the binder and dispersant in the solvent. Thereafter, the ceramic powder is added and vigorously mixed to form a colloidal suspension. Additional dispersant can be added if the resulting mixture is non-colloidal. This is followed by addition and dissolution of glycerol phosphate which is a non-polymeric hydroxylated phosphate which is added as a colloid stabilizer to enhance dispersion of and reduce dissolution of the ceramic particles. (see U.S. Pat. No. 5,624,604). This agent is added at about 1 wt % with respect to the suspension.

In a specific example, a solution is formed by mixing trichloroethylene (16 mL) with ethanol (59 mL), 2.4 g of polyvinyl butyral (e.g., Monsanto, Butvar, B-79) and 1 g Menhadem fish oil, followed by vigorous stirring until complete dissolution of the binder occurs. To this solution is added β"-alumina powder (60 g) possessing the desired particle size with vigorous stirring to keep the solution semi-colloidal. This is followed by addition of 1 g glycerol phosphate (Fisher Scientific) which is permitted to dissolve. After an additional 5 minutes, mechanical stirring is stopped and the mixture is allowed to stand for 15 minutes, to assess formation of a colloidal suspension. During this time, powder settling should be minimal. If, however, the mixture is found to be non-colloidal (powder separates), the dispersant content may be optimized by increasing it in 1 g increments, until a long lasting (15 minutes) colloidal suspension is produced. Once the colloidal suspension is formed, it is again stirred vigorously and 2.1 g of dioctyl phthalate and 2 g of polyethylene glycol (MW=400, Aldrich) added. The expected viscosity of the colloidal suspension (slip) is now about 3000 centipoise, approximately 3 times that for glycerol. This high viscosity permits initial adhesion to the β"-alumina tube during a dip-coating process. Following each dip coating the β"-alumina tube is gently rotated on a mandrel to permit the solution to superficially dry. This procedure may be repeated until the desired thickness of β"-alumina is present on the dense tube substrate. The resulting coated β"-alumina tube is now slowly heated to between 800 and 1100° C. for several hours, to promote an initial bisc sintering of what will be a porous region attached to the dense β"alumina tube.

Preparation of Ceria-Based Oxygen Anion- and Electron-Conducting Region of the Porous Matrix and the Dense Oxygen Anion- and Electron-Conducting Dense Layer. This method forms both the oxygen anion transport medium of the porous matrix and the fully dense layer which will be in direct contact with the oxygen-containing gas for the cathode employing a green tape of the mixed conducting mixed metal oxide by tape casting. The green tape is positioned in contact with the pre-sintered porous β"-alumina region formed on the dense β"-alumina. Sufficient solvent is retained within the tape to facilitate its initial superficial adhesion to the porous β"-alumina region prior to sintering. This will also permit doped ceria to partially migrate into the previously sintered porous β"-alumina region. Following final sintering, this will result in populating interfacial sites between sodium cation and oxygen anion conducting regions, to facilitate reversible electrochemistry at the oxygen electrode. The resulting assembly is co-sintered to achieve the porous matrix and the dense oxygen anion- and electron-conducting separator.

Precursor powders of the mixed conducting doped ceria are prepared by an oxalate coprecipitation method. In this method, amounts of the corresponding metal nitrates needed to achieve the desired stoichiometry of the mixed metal oxide are combined in deionized water to obtain a solution that is about 0.2 M in nitrate. The metal nitrate solution mixture is slowly introduced into a stirred oxalic acid solution (about 0.4 M), which results in an oxalate coprecipitate. Following filtering and washing with deionized water, the resulting precipitate is dried overnight at room temperature, followed by decomposition at 600° C. in air for 2 hours.

In a specific embodiment, the mixed conducting mixed metal oxide has formula $Co_{0.04}Co_{0.76}Gd_{0.2}O_{2-x}$.

A colloidal suspension for tape casting is prepared using the general procedure described above for preparation of the porous β"-alumina layer. In this case the resulting colloidal suspension is tape-cast.

Tape casting involves spreading the precursor suspension (the slip) incorporating the dispersed ceramic onto a smooth (glass) substrate, followed by slow solvent removal. This results in formation of a "green" ceramic tape, to be later sintered onto the outside of the porous β"-alumina layer. Initial preparation of this tape involves introducing the precursor solution (500 g total weight, 230 mL total volume) to the slip bottle on a conventional batch tape caster. The substrate (e.g., tempered glass) is initially coated with a light spraying of mineral oil to aid in the later removal of the tape after casting. The first doctor blade of the tape caster which performs initial slip spreading is adjusted to give a tape height thickness of about 0.35 mm, and the second blade is set to trim to 0.30 mm for final tape smoothing. The blade tractor speed is adjusted to about 10 cm/min and 50 mL of slip is introduced into the slip trough in front of the doctor blades. The sliding slip cut-off valve of the tape caster is adjusted to administer 5 mL/min of slip to the doctor blade trough. The blade tractor is started and the entire caster covered with a plexiglass top, to saturate the casting atmosphere with the solvent used to make the suspension. This ensures slow drying of the tape and prevents skinning, which can trap solvent in its interior and result in lower density material after sintering. Tractor speed, slip flow rates to the trough and atmosphere controls are adjusted as needed during the course of tape casting. After 3 hours of controlled (solvent saturated) atmosphere drying of the cast tape on the glass substrate, the plexiglass caster cover is removed and the tape is allowed to dry in ambient air at room temperature for one hour. All drying is performed in a fume hood for adequate ventilation of organic vapors. A third and final drying stage is performed by placing the removable tempered glass substrate bed in an oven at 60° C. for 2 hours.

After these drying stages the cast tape is "green" and ready to be cut and attached to the outside porous layer of the β"-alumina.

Incorporation of Ceria Tape onto Porous β"alumina

The green doped ceria tape is cut to an appropriate geometry to uniformly cover the outside of the porous β"alumina region formed on the dense β"-alumina substrate (e.g., tube). Sufficient solvent is retained within the green tape to facilitate its initial superficial adhesion to porous β"alumina region prior to sintering. Some bulk migration of green tape constituents into the porous β"alumina occurs during positioning of the green tape. The assembly is then co-sintered in air. Heating and cooling is slow, to avoid thermal stress between phases by providing a continuous annealing environment, employing sintering temperatures between 85 and 1250° C.

Various other methods can be employed for creating the porous matrix and in particular the dense outer layer of the oxygen electrode. Such alternative techniques include deposition, for example, RF sputter deposition, evaporation, for example e-beam evaporation, or spray methods, for example thermal spray techniques or plasma spray deposition. More specifically, MOCVD, Magnetron Sputtering and Electrochemical Vapor Deposition (EVD) methods can be employed. While such techniques are useful they can be more expensive than the methods specifically exemplified herein, and consequently may be less amenable to the manufacture of lower cost energy storage cells.

U.S. 2012/0219842 discloses certain tape casting methods which may be employed in the preparation of the porous matrix of the invention. This reference is incorporated by reference herein in its entirety for a description of this method.

Fabrication of Cell Hardware

A schematic of the general cell hardware is provided in FIG. 2. For a tubular sodium/oxygen cell, current collection from the oxygen electrode is achieved by winding platinum wire around the outside of the tube, providing electrical contact between the current collector and the dense mixed conducting ceramic using a cured platinum paint. Liquid sodium is added to the tube assembly in an argon dry box. The tube assembly is slowly heated to 150° C. and liquid sodium is slowly introduced into the tube. A low carbon steel current collector is introduced co-axially into the tube in contact with the liquid sodium through a feedthrough cap and the tube end is hermetically sealed using a glass-ceramic seal.

Cell Testing

Electrochemical performance of cell hardware is assessed at least in part by determining the current and voltage efficiency as well as overall rates and cycle life. Cells are operated cathode limited to determine Faradaic utilization.

Performance of batteries fabricated in the fully charged state is assessed by determining:
the overall electrochemical energy conversion efficiency as a function of operating temperature between 150 and 300° C.; applied current density between 50 and 200 $mA/cm^2$ during charge/discharge; and
the volumetric charge capacity that can be realized from the cathode, ($mAh/cm^3$).

Discharge curves under constant current loads are measured at various practical C (drain rates) as a function of operating temperature.

Additionally, cells are subjected to extended charge/discharge cycling tests to identify evidence of degradation by cell components as a function of time. Again, this assessment is performed at nominal current densities between 50 and 200 $mA/cm^2$.

Batteries of the invention preferably can be operated for at least 100 charge/discharge cycles under constant current load without significant capacity fade.

I claim:

1. A storage cell comprising:
   a negative electrode comprising liquid alkali metal;
   a positive oxygen electrode comprising:
   a porous mixed metal oxide matrix,
   a dense separation element which conducts oxygen ions and electrons and which is formed of a first mixed metal oxide which conducts oxygen ions and electrons; and
   a source of oxygen-containing gas;
   wherein the dense oxygen ion- and electron-conducting separation element is intermediate between the porous matrix and the source of oxygen-containing gas; and
   a dense alkali metal cation-conductive solid electrolyte which is positioned between the negative electrode and the porous matrix and which is formed from a second mixed metal oxide which conducts the alkali metal cation;
   wherein the porous matrix of the positive electrode is positioned between the solid electrolyte and the dense mixed metal oxide separator element for receiving oxygen anions and alkali metal cations, the porous matrix not in direct contact with the oxygen-containing gas or liquid alkali metal, the porous matrix formed from the first and second mixed metal oxides and containing one or more regions which conduct the alkali metal cation and the oxygen anions, wherein the alkali metal and the oxygen ions can react to form discharge product which is retained within the porous matrix.

2. The storage cell of claim 1 wherein the alkali metal is sodium.

3. The storage cell of claim 2 wherein the sodium-ion conductive mixed metal oxide is beta"-alumina and the porous matrix comprises from beta"-alumina.

4. The storage cell of claim 1 wherein the sodium-ion conductive mixed metal oxide is beta"-alumina and the porous matrix comprises from beta"-alumina.

5. The storage cell of claim 1 wherein the mixed metal oxide which conducts electrons and oxygen anions comprises cerium.

6. The storage cell of claim 1 wherein the mixed metal oxide which conducts oxygen ions and electrons is a transition metal-doped ceria.

7. The storage cell of claim 6 wherein the mixed metal oxide which conducts oxygen ions and electrons is a transition metal-doped ceria which further comprises one or more rare earth metals in addition to cerium.

8. The storage cell of claim 1 wherein the mixed metal oxide which conducts oxygen ions and electrons is $Co_{0.04}Ce_{0.76}Gd_{0.2}O_{2-x}$.

9. The storage cell of claim 1 which is rechargeable wherein the discharge product of the cell accumulates within the porous matrix of the positive electrode during discharge and on recharging the discharge product reacts to form sodium ions and oxygen ions which return to the anode and cathode, respectively.

10. The storage cell of claim 1 which is operated at a temperature between about 150 to 300° C.

11. The storage cell of claim 1 wherein the positive electrode further comprises an oxygen-redox catalyst.

12. A battery comprising one or more storage cells of claim 1.

13. A method for generating energy, comprising forming one or more cells of claim 1 and discharging the one or more cells.

14. The method of claim 13 further comprising a step of storing electrical energy wherein the one or more cells are rechargeable and wherein after discharge the one or more cells are recharged by application of a voltage to the cell.

15. A method for producing a storage cell comprising:
   forming a negative electrode comprising liquid sodium;
   forming an oxygen positive electrode comprising a porous mixed metal oxide matrix, and a dense separator which conducts oxygen ions and electrons formed of a mixed metal oxide which conducts electrons and oxygen ions; and
   positioning a dense, alkali metal cation-conductive solid electrolyte formed from a alkali metal cation-conductive mixed metal oxide between the negative electrode and the positive electrode and
   providing a source of oxygen-containing gas and a source of liquid alkali metal;
   wherein the porous matrix is formed from the alkali metal cation-conductive mixed metal oxide and the mixed metal oxide which conducts oxygen anions and electrons for receiving alkali metal cations and oxygen anions and discharge products thereof, the porous matrix in contact with the dense alkali metal cation-conductive solid electrolyte and the dense oxygen ion- and electron-conducting mixed metal oxide, the porous matrix not in direct contact with the source of alkali metals or the oxygen-containing gas, and the dense mixed metal oxide separator of the cathode in direct contact with the oxygen-containing gas.

16. The method of claim 15 wherein the porous matrix is formed as a porous layer on the dense, non-porous alkali metal cation-conductive solid electrolyte.

17. The method of claim 15 wherein the dense oxygen ion and electron conducting separator is formed as a dense layer on the porous layer forming the porous matrix.

18. The method according to claim 15, comprising forming reduced oxygen species at the oxygen positive electrode with alkali metal cations provided by the negative electrode, on discharge of the cell.

19. The method according to claim 15, wherein the cell is rechargeable.

20. The method according to claim 15 wherein the alkali metal is sodium.

* * * * *